Oct. 4, 1966  R. L. WESTINGHOUSE  3,276,180
REMOVABLE PANEL-HOLDING CLIP IN COMBINATION
WITH APERTURED STRUCTURAL ELEMENTS
Filed May 26, 1964  2 Sheets-Sheet 1

INVENTOR:
RICHARD LAWRENCE WESTINGHOUSE
By
E. M. Squire
ATTY.

Oct. 4, 1966   R. L. WESTINGHOUSE   3,276,180
REMOVABLE PANEL-HOLDING CLIP IN COMBINATION
WITH APERTURED STRUCTURAL ELEMENTS
Filed May 26, 1964   2 Sheets-Sheet 2

INVENTOR
RICHARD LAWRENCE WESTINGHOUSE
BY
E. M. Squire
ATTY.

United States Patent Office 3,276,180
Patented Oct. 4, 1966

3,276,180
REMOVABLE PANEL-HOLDING CLIP IN COMBINATION WITH APERTURED STRUCTURAL ELEMENTS
Richard L. Westinghouse, Florence, Italy, assignor to Terlan Research Establishment, Vaduz, Liechtenstein, a corporate body of Liechtenstein
Filed May 26, 1964, Ser. No. 370,201
Claims priority, application Italy, June 7, 1963, 12,042/63
6 Claims. (Cl. 52—489)

This invention relates to prefabricated partitioning or like structural systems, and more particularly relates to clips for securing panels of glass or other material to supporting structures in said systems.

The invention consists in a clip for securing panels of glass or other material to a perforated supporting structure, said clip comprising a plate having at least one pair of co-operating resilient studs upstanding therefrom for engagement in one or more perforations in said structure, one edge portion of said plate being shaped to overlap said panel and secure it to said structure.

The invention also consists in a prefabricated partitioning or like structural system comprising a frame formed of interconnecting lengths of constructional elements formed of perforated L or channel section metal, and one or more panels of glass or other material secured to said frame by a plurality of clips each according to the clip defined in the preceding paragraph.

Structural systems according to the invention enable for example a partition comprising a plurality of channelled or co-operating L-section perforated constructional elements, e.g. metal rails, to be clad on both sides, which has not previously been possible with rails necessitating the employment of bolts for securing the cladding material.

By employing clips according to the invention, the erection time of a partition or the like may be considerably reduced from that necessary in other systems, the clips merely being pressed into place in the perforated constructional elements.

In order that the invention can be fully understood a preferred embodiment thereof will now be described with reference to the accompanying drawing, in which.

Figure 1:
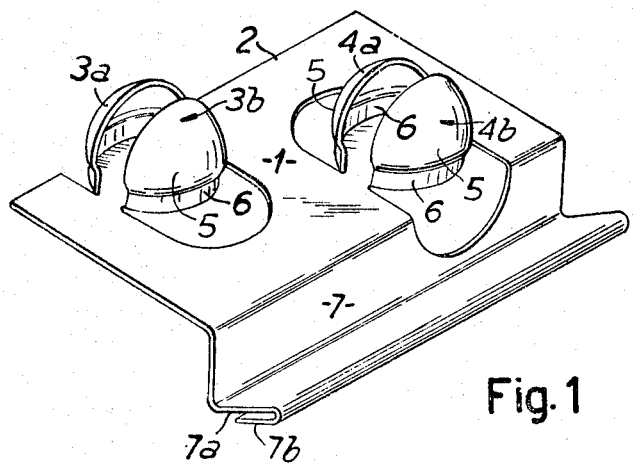
FIGURE 1 illustrates a perspective view of one side of a clip according to the invention.
Figure 2:
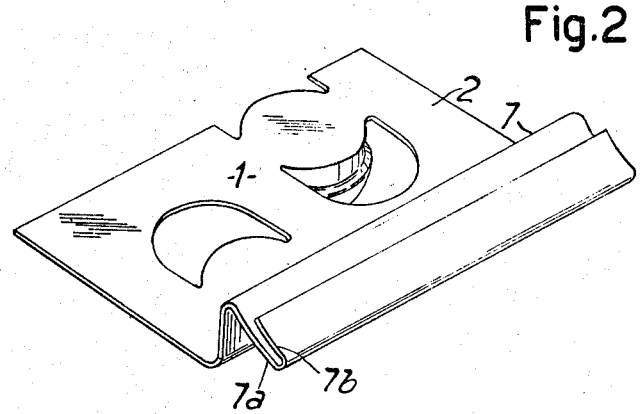
FIGURE 2 illustrates a perspective view of the other side of a clip according to the invention.

Referring now to FIGURES 1 and 2, a clip according to this invention comprises a metal plate 1 having a flat portion 2 from which have been pressed two pairs of co-operating upstanding resilient studs 3a, 3b, and 4a, 4b.

Each stud has a head portion 5 and a neck portion 6, the two co-operating head portions defining segments of a common substantially spherical surface, and the co-operating neck portions defining arcs of a common circle.

One edge 7 of the plate is bent upwardly in a direction opposite to that of the upstanding studs and is shaped in such a manner as to accommodate a cover strip between two co-operating portions 7a, 7b, as will be more particularly described hereinafter.

The clips may be designed in such a manner that the co-operating studs can be pressed into constructional elements having round-cornered right isosceles triangular apertures formed therein as disclosed in United States application No. 203,602, filed June 19, 1962, now Patent No. 3,232,019, issued on February 1, 1966, to Arthur John Campbell, the dimensions and configurations of the head portions of these studs being such that they pass through a perforation in these elements under constraint and thence overlap the periphery of this perforation to lock the clip to the element.

Figure 3:
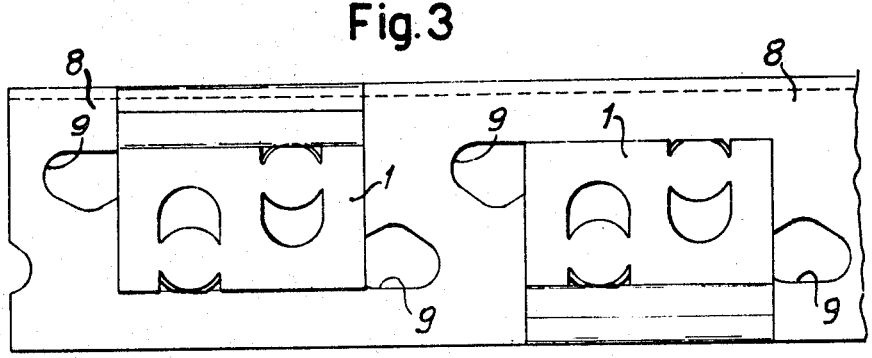
FIGURE 3 illustrates a side view of two clips pressed into place in a constructional element.

In FIGURE 3 there is illustrated such a constructional element 8, having perforations 9 into which two clips 1 have been pressed.

Figure 4:
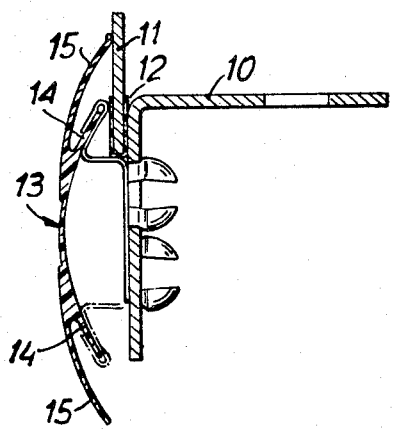
FIGURE 4 illustrates a sectional view through a constructional element having a clip pressed into place therein, a cover strip secured to the clip resiliently engaging a glass panel employed as cladding.

Referring now to FIGURE 4 there is illustrated an angle section of a constructional element 10 which may conveniently form part of a prefabricated partitioning system. A plurality of clips 1 (of which only two can be seen) are pressed into the element at intervals along the length thereof, alternate ones of the clips lying in one position and intermediate ones of the clips lying in another position so that the edge portions of adjacent clips are oppositely disposed on one face of the element.

A panel of glass 11 or other material for cladding the partition, e.g. hardboard, sheet steel or asbestos-cement sheet, is held in contact with the element 10 by the tension of the edge portions 7 of the clips.

A protective strip of foam plastic 12 or the like extends around the edge of the glass panel 11 and lies intermediate this panel and both the edge portions 7 of the clips and the element 10 so as to prevent direct contact between the glass panel and these metallic parts and possible damage to this panel in consequence.

The structure is completed by covering the sides of the clips otherwise exposed to view by a cover strip 13 which may conveniently consist of a hard plastic material, the strip comprising two spaced inner flanges 14 extending along the lengths thereof and two outer skirts 15 which overlap the corresponding inner flanges 14.

The inner flanges 14 are accommodated between the portions 7a, 7b of the clips and the outer skirts 15 conceal the exposed edges of these clips and abut against the panel 11.

What I claim is:
1. In combination:
   an elongate support element having a plurality of spaced apertures along the length thereof, and
   a clip secured to said support element, said clip including
   a body of sheet material having
      a main portion,
         an upstanding portion extending from one edge of said main portion, and
         a tongue portion extending from that edge of the upstanding portion opposite that edge contiguous with the main portion and at an angle inclined to the main portion, and
      a pair of resilient domed studs upstanding from said main portion on the opposite face of said main portion from said upstanding portion,
   each of said studs engaging in a said aperture in said element and said tongue portion being spaced from said element by an amount sufficient to clamp resiliently a panel of sheet material against said element.

2. The combination claimed in claim 1, said clip further comprising:
   a bent-over edge portion extending along the edge of said tongue portion remote from said upstanding portion,
   said bent-over edge portion and said tongue portion together defining a resilient-walled slot for receiving an edge portion of a piece of trim material to be received in said slot.

3. The combination claimed in claim 2, wherein a plurality of said clips comprises:
   an opposed pair of said upstanding portions, said tongue portions and said bent-over edge portions whereby opposite edges of trim material can be secured in the resilient-walled slots formed by said pair of bent-over edge portions.

4. The combination according to claim 1, wherein a plurality of said clips comprises:
means arranged to support said panel of sheet material, said clips being disposed with the upstanding portions of alternate clips arranged along opposite edges thereof.

5. A sheet metal clip comprising:
a main portion,
a pair of studs upstanding from one surface of the main portion; each stud including
 a split part-spherical head and
 a split cylindrical neck connecting said head to the main portion; and
a resilient extension of V-section having one edge thereof integrally formed with one edge of the main portion and having a free edge,
said free edge being spaced from the plane containing the said one surface of the main portion whereby a panel of sheet material can be engaged between said free edge and an element to which the clip is secured by engagement of said studs in apertures in said element.

6. In combination:
an elongate support element having a plurality of spaced apertures along the length thereof, and
a clip secured to said support element including
a main portion,
 a pair of studs upstanding from one surface of the main portion; each stud including
 a split part-spherical head and
 a split cylindrical neck connecting said head to the main portion; and
 a resilient extension of V-section having one edge thereof integrally formed with one edge of the main portion and having a free edge,
each of said studs engaging in an aperture in said element and said free edge being positioned for gripping engagement with an edge of a panel of sheet material against a contiguous portion of the said element.

References Cited by the Examiner
UNITED STATES PATENTS

| | | | |
|---|---|---|---|
| 1,725,559 | 8/1929 | Beman | 52—202 |
| 1,769,727 | 7/1930 | Walters | 24—73 |
| 2,184,250 | 12/1939 | Chaffee | 24—213 |
| 2,360,647 | 10/1944 | Churchill. | |
| 2,848,761 | 8/1958 | Hahn | 52—208 |
| 3,181,662 | 5/1965 | Maertzig | 52—509 |

HARRISON R. MOSELEY, *Primary Examiner.*

W. E. HEATON, *Assistant Examiner.*